United States Patent [19]

Roy

[11] 4,333,629

[45] Jun. 8, 1982

[54] FLOATING MANIFOLD FOR MULTI-CAVITY INJECTION MOLD

[75] Inventor: Siegfried S. Roy, Amherst, N.H.

[73] Assignee: Pepsico, Inc., Purchase, N.Y.

[21] Appl. No.: 129,442

[22] Filed: Mar. 11, 1980

[51] Int. Cl.³ .............................................. B29F 1/03
[52] U.S. Cl. .............................. 249/119; 137/561 A; 249/135; 425/572
[58] Field of Search ...................... 137/561 A, 561 R; 425/567, 568, 569, 570, 571, 572; 249/119, 135

[56] References Cited

U.S. PATENT DOCUMENTS

| | | | |
|---|---|---|---|
| 3,677,682 | 7/1972 | Putkowski | 425/567 |
| 3,704,723 | 12/1972 | Wheaton et al. | 137/561 A |
| 3,849,048 | 11/1974 | Bielfeldt et al. | 425/567 |
| 4,219,323 | 8/1980 | Bright | 425/572 |
| 4,276,014 | 6/1981 | Aoki | 425/570 |

*Primary Examiner*—William R. Cline
*Attorney, Agent, or Firm*—Scully, Scott, Murphy and Presser

[57] ABSTRACT

This relates to a manifold construction for multi-cavity molds. The manifold is joined to a primary sprue by a transverse supply tube which is transversely telescoped relative to an associated manifold so as to permit relative transverse movement between the supply tube and the manifold. The manifold also carries longitudinally extending delivery tubes each of which is mounted for relative longitudinal movement between the manifold and an associated cavity. The manifold is generally positioned between the supply tube and the delivery tube which permits floating of the manifold relative to the various cavities of the mold and the primary sprue.

6 Claims, 3 Drawing Figures

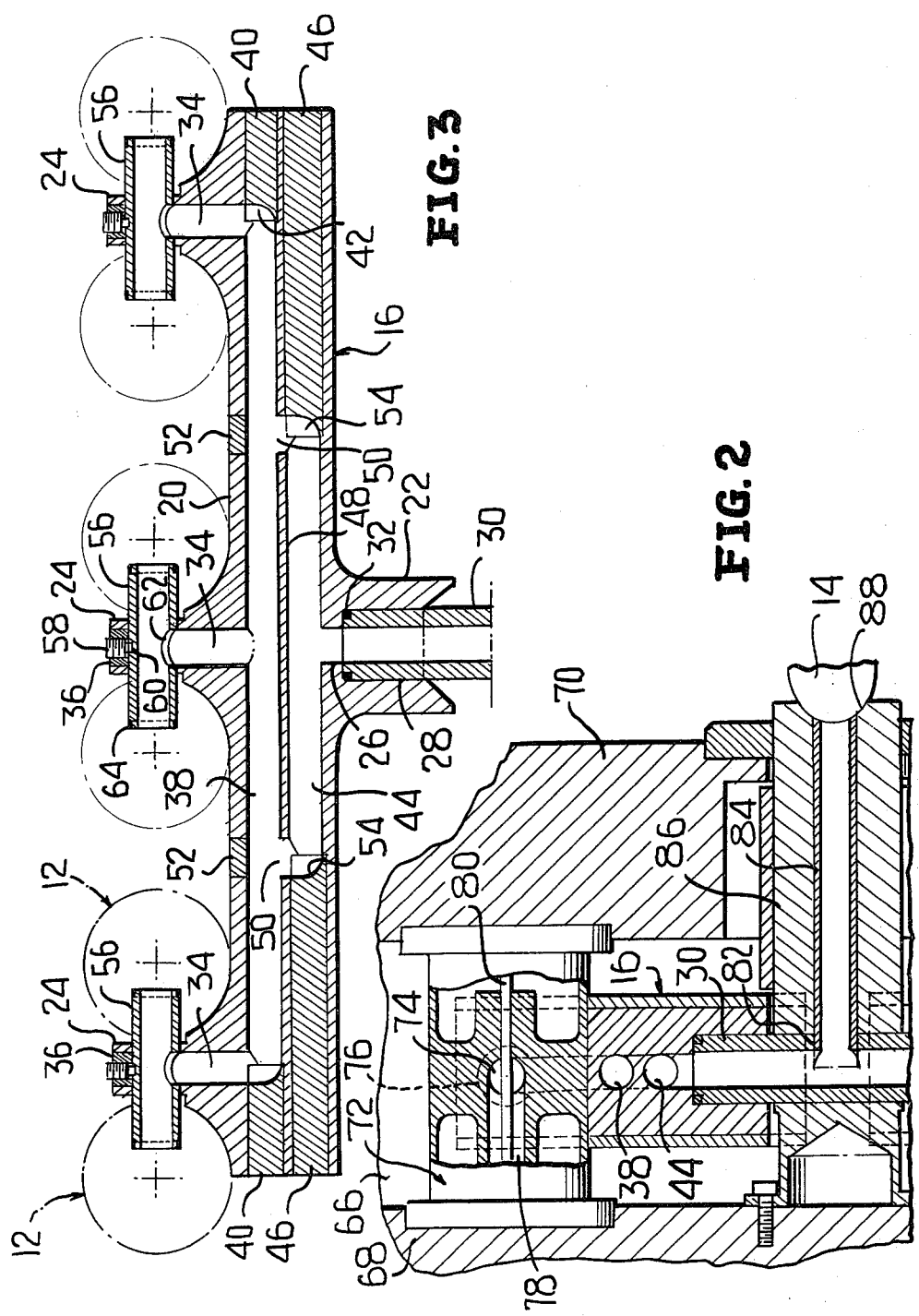

FLOATING MANIFOLD FOR MULTI-CAVITY INJECTION MOLD

This invention relates in general to new and useful improvements in injection molds wherein plastic articles are injection molded with each cavity having a separate supply passage, and wherein the relationship of the cavities with respect to the extruder is one wherein dimensional variations due to thermal changes present an alignment problem.

It is to be understood that molds for the injection molding of plastic articles must have a manifold construction wherein plastic melts may be equally distributed to each cavity at relatively high pressures. As the number of cavities increases, this problem becomes more difficult, particularly with respect to the alignment of manifold passages with cavity passages.

In the past, in order to obtain a minimal passage length with all passage lengths being equal, plural cavities have been arranged in a circular pattern. This is both unnecessary and undesirable. It has been found that the best cavity arrangement is an H-arrangement with the primary sprue being centered along the crossbar of the H. However, this places the remote cavities a greater distance from the primary sprue than others of the cavities. Further, because the mold heats up and because the mold is subject to temperature variations even during the molding of individual articles, the greater the number of cavities the greater the problem of manifold passage alignment with cavity passages.

The difficulty of alignment of the manifold passages with the cavity passages under varying temperature operating conditions has been readily solved in accordance with this invention by providing a floating manifold which is mounted on tubes which are coupled to the various cavities and to the primary sprue and which tubes have slideable connections which permit the manifold to expand both longitudinally and transversely without misalignment of the flow passages therethrough.

With the above and other objects in view that will hereinafter appear, the nature of the invention will be more clearly understood by reference to the following detailed description, the appended claims, and the several views illustrated in the accompanying drawings.

IN THE DRAWINGS

FIG. 2 is an enlarged fragmentary sectional view taken generally along the line 2—2 of FIG. 1, and shows further the details of the flow passages of the manifold.

FIG. 3 is a horizontal sectional view taken through the central portion of one of the manifolds, and shows the specific details thereof.

Figure 1:
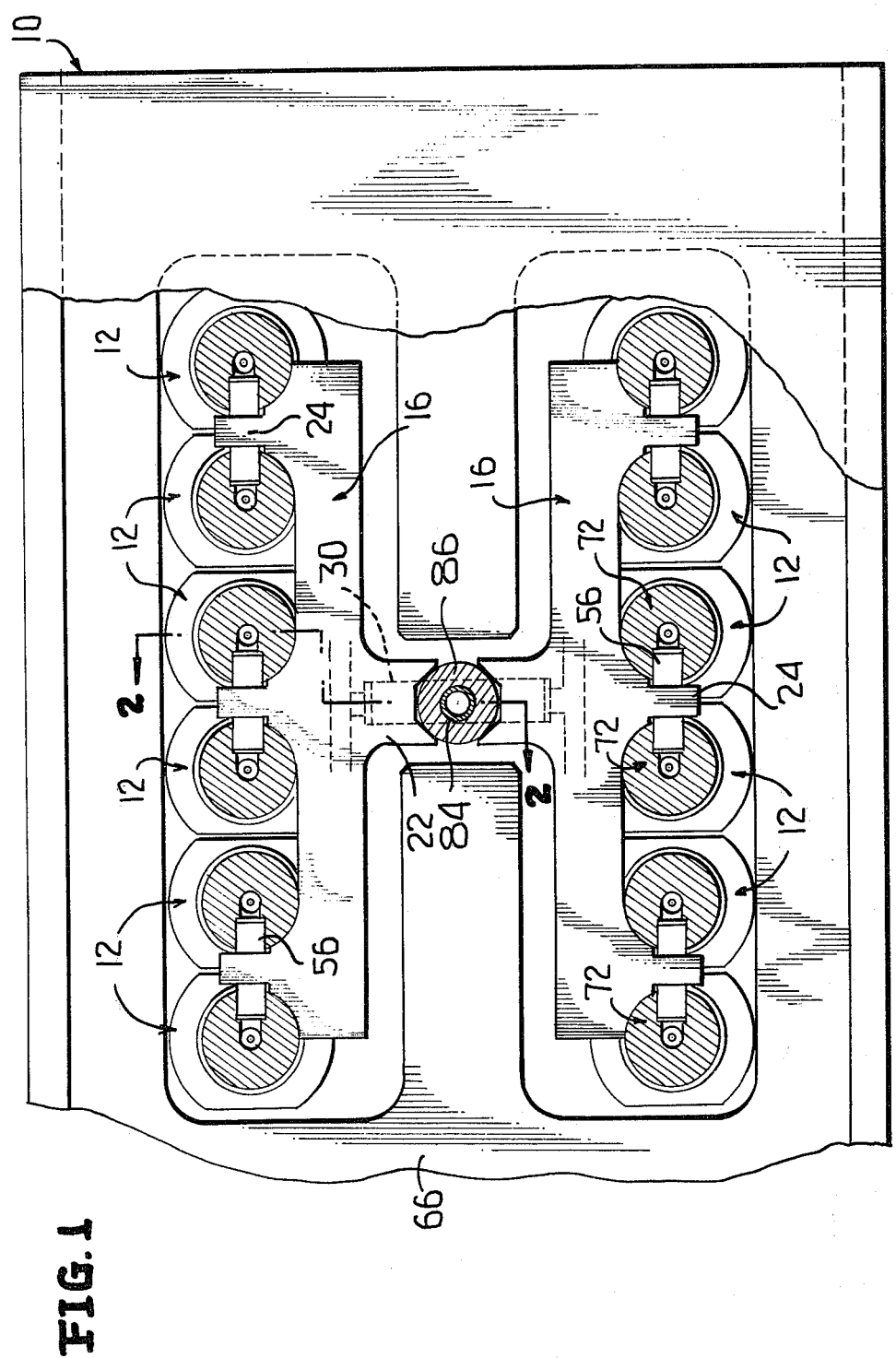
FIG. 1 is a plan view of an injection molding multiple-cavity mold having incorporated therein a manifold arrangement in accordance with this invention, parts being broken away and shown in section.

Referring now to the drawings in detail, in FIG. 1 there is illustrated a multiple cavity injection mold 10 which in the illustrated embodiment is a twelve cavity mold, with the cavities arranged in two series of six cavities each. Each cavity is generally identified by the numeral 12 and the details of the cavity in no way form a part of this invention.

This invention has to do with the manifold construction for delivering plastic melt from an extruder 14 (FIG. 2) to the individual cavities. In order to accomplish this delivery of the plastic melt, in accordance with this invention the mold 10 is provided with two separate manifolds, each identified by the numeral 16. It is to be understood, however, that in accordance with this invention all cavities of the mold may be in a single row or a single arcuate path, and a single manifold 16 may be provided.

Referring now to FIG. 3 wherein the specifics of one of the manifolds 16 are illustrated, it is to be understood that the specifics of the manifold 16 are peculiar for a twelve cavity mold, six cavities per manifold, and that there would be a variation in the passages of the manifold as the number of cavities is modified.

The manifold 16 is preferably in the form of a solid block 20 having an inlet 22 on one side thereof and a plurality of exit projections 24 on the opposite side thereof, there being preferably one exit projection 24 for each pair of cavities 12.

The inlet projection 22 has a supply passage 26 therethrough which has the outer portion thereof enlarged as at 28 to receive a supply tube 30. The supply tube 30 is telescoped in the enlarged passage portion 28 and is slideable with respect to the projection 22 so as to permit dimensional increases of the manifold 16 in a transverse direction while maintaining alignment of the various portions thereof. The supply tube 30, which will be described in more detail hereinafter, is provided on the end thereof with a sealing ring 32 which is preferably formed of metal having a greater thermal coefficient of expansion than the metal of the manifold 16. The sealing ring 32 is preferably formed of copper and assures a seal with the enlarged passage portion 28 irrespective of the position of the sealing ring 32 longitudinally of the passage portion 28.

Each of the exit projections 24 is provided with an exit passage 34 which is drilled therein and which has the outer end thereof closed by a plug 36 which is preferably welded in place. Each exit passage 34 terminates in an internal passage 38 which extends longitudinally. The internal passage 38 is preferably formed by drilling from one or both ends of the manifold and thereafter the ends of the passage 38 are closed by plugs 40 which are preferably permanently welded in place. The inner end of each of the plugs 40 is configurated as at 42 to provide for a uniform transition between the internal passage 38 and the associated exit passage 34.

When the number of cavities divided by two is an odd number, such as when the number of cavities is six, one of the exit projections 24 is aligned with the inlet passage 26 and therefore the manifold 16 must have an internal baffle arrangement so as to prevent the plastic melt entering into the manifold being directed primarily into that exit passage 34. To this end the manifold 16 includes an internal passage 44 which is parallel to the passage 38 generally at the quarter points thereof. The internal passage 44 is formed by drilling in a like manner to that described with respect to the formation of the passage 38 and has the opposite ends thereof closed by plugs 46 which are welded in place. In order that the passage 38 may be in communication with the passage 44, an internal partition wall 48 between the passages 38 and 44 is provided with a bore 50 which is formed by drilling through the wall of the manifold 16 and closing the external openings by means of plugs 52 which are also welded in place. It is also to be noted that the inner ends of the plugs 46 are to be preformed as at 54 to provide for smooth transition of the direction of flow of the plastic melt from the passage 44 through the openings 50 into the passage 38.

Each exit passage 34 is coupled to a pair of cavities 12 by a delivery tube 56. Each delivery tube 56 extends transversely of the respective exit projection 24 and thus transversely of the associated exit passage 34. Each delivery tube 56 is fixed relative to its respective exit projection 24 by a pin 58 carried by its associated plug 36 with the pin 58 being engaged in a slot or keyway 60 formed in the external surface of the delivery tube 56. While the pin 58 is illustrated as being more in the form of a set screw, it is to be understood that in most instances the pin 58 will be directly into the plug 36 and in most instances welded in place. The pin 58 assures alignment of an inlet passage 62 formed in the delivery tube 56 with the exit passage 34.

It is to be noted that all of the delivery tubes 56 are in longitudinal alignment, at least when the manifold 16 is initially formed. It is to be understood that each delivery tube 56 is floatingly associated with its respective cavity 12 so that the delivery tubes 56 are free to move longitudinally. In a like manner, as previously described, the manifold 16 is free to move transversely on the supply tube 30. Thus it will be readily apparent that the manifold 16 is floatingly mounted with respect to the various components of the mold 10. It is also to be noted that each delivery tube 56 is provided at its opposite ends with sealing rings 64 which correspond to the sealing rings 32 and preferably will be formed of a metal, such as copper, having a higher thermal coefficient of expansion than that of the manifold 16.

Referring now to FIG. 2, it will be seen that the manifold 16 is positioned within a stand-off plate 66 between a cavity plate 68 and a base plate 70. In the illustrated embodiment of the invention each cavity 12 has associated therewith a nozzle holder 72 which is mounted in the stand-off plate 66 between the cavity plate 68 and the base plate 70. The nozzle holder 72 is provided with an inlet passage 74 which has an enlarged outer portion 76 of a size to receive an end portion of one of the delivery tubes 56. The inlet passage 74 opens into a delivery passage 78 which is directed towards the respective cavity 12 with flow from the passage 78 into the cavity 12 being controlled by a valve rod 80. It will thus be seen that since the delivery tube 56 can move into and out of the nozzle holder 72 while maintaining a seal therewith, longitudinal expansion or contraction of the manifold 16 is permissible. Further details of the nozzle assembly can be ascertained in patent application Ser. No. 129,444, filed Mar. 11, 1980, for NOZZLE ASSEMBLY FOR INJECTION MOLD CAVITY, by Siegfried S. Roy and commonly assigned herewith.

In FIG. 2 there is also illustrated the manner in which the supply tube 30 receives plastic melt. The supply tube 30 is provided intermediate its ends and between the two manifolds 16 with an inlet passage 82 through which there projects into the interior of the supply tube 30 one end of a main sprue 84 which is in the form of an elongated tube. The main sprue 84 and the supply tube 30 are mounted within a suitable support block 86 which extends through the stand-off plate 66 and is positioned by both the cavity plate 68 and the base plate 70. The opposite end of the main sprue 84 and the adjacent end of the support block 86 are configurated as at 88 for sealed engagement with the nose of the extruder 14 as shown.

As pointed out above, there may be a single one of the manifolds 16. Further, it is feasible that when a peculiar number of cavities are desired, one end of the delivery tube 56 may be closed so that the delivery tube may supply plastic melt to but a single cavity. It will thus be apparent that the principles of the floating manifold construction may be readily adapted to molds having any number of cavities.

Although only a preferred embodiment of the manifold assembly has been specifically illustrated and described herein, it is to be understood that minor variations in the manifold construction may be made without departing from the spirit and scope of the invention as defined by the appended claims.

I claim:

1. A multiple cavity injection mold assembly wherein material is injection molded from an extruder into a plurality of mold cavities in a manner involving substantial thermal gradients and expansions, comprising:
    a. a supply tube, extending in a transverse direction, for supplying molding material from an extruder to the plurality of mold cavities;
    b. a plurality of mold cavities having inlet passageways extending in a longitudinal direction, substantially orthogonal to said transverse direction; and
    c. a floating manifold positioned between said supply tube and said inlet passageways to the plurality of mold cavities and designed to accommodate thermal expansions in both said transverse and longitudinal directions, said manifold having an inlet passageway extending in said transverse direction and being in telescoped relation with said supply tube and further having exit passageways extending in said longitudinal direction and being in telescoped relation with said inlet passageways to said plurality of mold cavities, whereby the telescoped relations in both the transverse and longitudinal directions allow the manifold to positionally float to accommodate thermal expansions in both directions.

2. A multiple cavity injection mold assembly as claimed in claim 1, said exit passageways of said floating manifold comprising relatively thin cylindrical tubes, whereby the thin cylindrical tubes minimize heat transfer between the manifold and the plurality of mold cavities.

3. A multiple cavity injection mold assembly as claimed in claim 2, each thin cylindrical tube extending between a pair of inlet passageways of a pair of mold cavities, with one inlet passageway being positioned at each end of the thin cylindrical tube.

4. A multiple cavity injection mold assembly as claimed in claim 1, wherein a metallic sealing ring, having a coefficient of thermal expansion greater than that of said manifold, is positioned between said supply tube and the inlet passageway of said manifold.

5. A multiple cavity injection mold assembly as claimed in claim 1, wherein a metallic sealing ring, having a coefficient of thermal expansion greater than that of said manifold, is positioned between each exit passageway of said manifold and each inlet passageway to a mold cavity.

6. A multiple cavity injection mold assembly as claimed in claims 1 or 2 or 3 or 4 or 5, wherein a second floating manifold substantially identical to said floating manifold is positioned at a second end of said supply tube in a substantially symmetrical arrangement.

* * * * *